United States Patent
Freeman et al.

(10) Patent No.: US 12,200,569 B2
(45) Date of Patent: Jan. 14, 2025

(54) GUIDANCE TO A TARGET LOCATION

(71) Applicants: AT&T Intellectual Property I, L.P., Atlanta, GA (US); AT&T Mobility II LLC, Atlanta, GA (US)

(72) Inventors: Brian Freeman, Farmingdale, NJ (US); Barry Elia, King George, VA (US); Suja John, Herndon, VA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 347 days.

(21) Appl. No.: 17/718,615

(22) Filed: Apr. 12, 2022

(65) Prior Publication Data
US 2023/0328478 A1 Oct. 12, 2023

(51) Int. Cl.
*H04W 4/024* (2018.01)
*H04W 84/12* (2009.01)

(52) U.S. Cl.
CPC ............ *H04W 4/024* (2018.02); *H04W 84/12* (2013.01)

(58) Field of Classification Search
CPC ........ H04W 4/024; H04W 84/12; H04W 4/90
USPC ....................................................... 455/457
See application file for complete search history.

(56) References Cited

U.S. PATENT DOCUMENTS

| | | | | |
|---|---|---|---|---|
| 2011/0141979 A1* | 6/2011 | Keller | ............ | H04W 36/00226 370/328 |
| 2016/0150574 A1* | 5/2016 | Edge | .................. | H04L 61/2564 455/404.2 |
| 2016/0249193 A1* | 8/2016 | Edge | ........................ | H04L 67/02 |
| 2019/0098133 A1* | 3/2019 | Poikselka | ............. | H04W 12/06 |

* cited by examiner

*Primary Examiner* — Don N Vo

(57) ABSTRACT

Architectures and techniques are presented that can leverage network equipment (e.g., broadband provider equipment, cellular provider equipment) in order to provide enhanced guidance to a target location. This enhanced guidance can supplement existing mapping or navigation equipment. Such can be advantageous for public safety answering point entities and first responder entities as well as, potentially, for service technicians or delivery. When an entity (e.g., first responder) is dispatched to a particular location, an associated residential gateway (RG) or other device can be identified, and an associated SSID determined. This SSID can be provided to the entity seeking that particular location so that SSID scans can operate similar to a transponder or homing beacon. The SSID might also be configured specially for this purpose. Additionally, the state of a device attached to the RG can be altered to further aid in locating, such as blinking porch lights or audible indicia.

20 Claims, 10 Drawing Sheets

GUIDANCE TO A TARGET LOCATION

TECHNICAL FIELD

The present application relates generally to improved guidance to a target location and, more particularly, to supplementing conventional navigation techniques with additional techniques that can improve identification of a target location.

BACKGROUND

Today, first responder entities (e.g., medical, fire, police, and so on) rely heavily on mapping or navigation software in order to quickly and accurately arrive at a location in which those services are needed. For example, consider an emergency services call (e.g., 911 or the like) that gets routed to a public safety access point (PSAP), sometimes also referred to as a public safety answering point or public safety acknowledgement point. PSAP operators will in some way ascertain the nature of the emergency and the location of the emergency. Thereafter, the appropriate emergency service can be dispatched to that location, typically relying on some type of navigation application or service to reach the target destination quickly. Thus, being able to efficiently serve the emergency is reliant on the quality of the navigation application or service, as inaccuracies or insufficient detail can lead to potential life-threatening delays in the arrival of the emergency service entity.

BRIEF DESCRIPTION OF THE DRAWINGS

Numerous aspects, embodiments, objects and advantages of the present application will be apparent upon consideration of the following detailed description, taken in conjunction with the accompanying drawings, in which like reference characters refer to like parts throughout, and in which.

DETAILED DESCRIPTION

Overview

Figure 1:
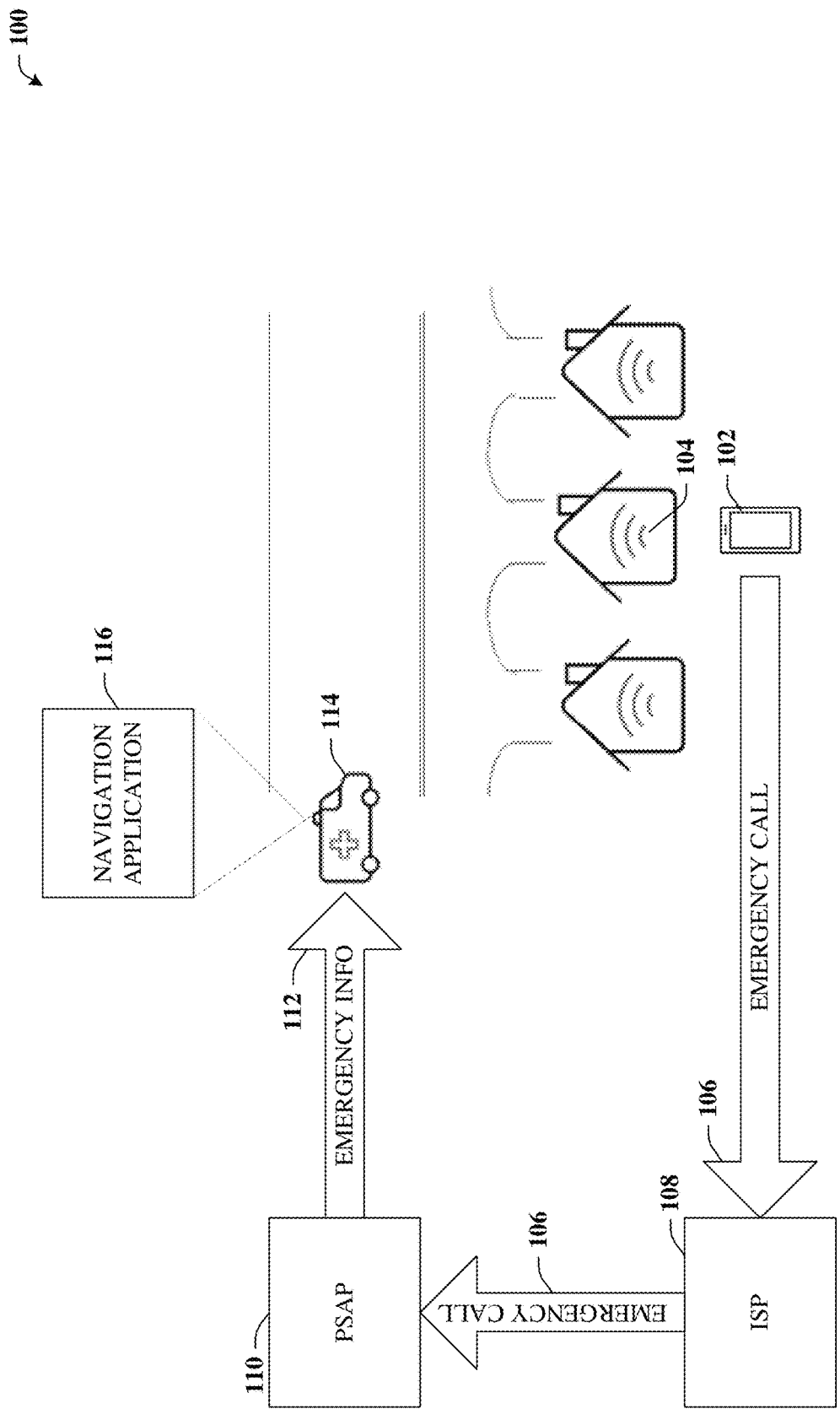
FIG. 1 illustrates a schematic block diagram of an example emergency service request scenario presented in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

In order to better describe the disclosed subject matter, it can be instructive to consider certain existing techniques used in the emergency services domain, an example of which can be found at FIG. 1.

With reference now to FIG. 1, a schematic block diagram 100 of an example emergency service request scenario is presented in accordance with certain embodiments of this disclosure. Suppose an occupant at a residential address places an emergency services request. In this example, the occupant dials 911 on his or her mobile device 102. Mobile device 102 is attached to a wireless local area network (WLAN) of the residence that is provided by residential gateway 104. Emergency call 106 is initially received by the occupant's Internet service provider (ISP) 108 and/or a voice over IP (VoIP) service provider, or other suitable entity, and then routed to a local public safety answering point (PSAP) 110. In this case, emergency call 106 typically takes the form of an enhanced 911 (E911) call, which can be configured to automatically provide PSAP 110 a location associated with the call. Additionally or alternatively, PSAP 110 can obtain the location from the occupant during the call or in some other way.

Once the location of the residential address has been acquired, PSAP 110 can dispatch emergency services entity 114, which can be one or more of medical services, fire services, police services, and so forth, that can potentially be selected based on information provided during emergency call 106. For example, if the nature of the call relates to a break-in or the like, a policing entity can be dispatched, whereas if the nature of the call relates to a medical emergency, a medical entity can be dispatched. PSAP 110 can further provide emergency information 112 to emergency services entity 114. Emergency information 112 can include the nature of the emergency, the location (e.g., residential address) of the emergency, or any other relevant information. Typically, based on the residential address, emergency services entity 114 relies on some type of navigation application 116 to quickly and accurately navigate to the occupant's residence.

In some cases, navigation application 116 suitably serves to rapidly reach the general vicinity of the target location of the emergency, but fails to provide a clear indication of the target location upon getting to the general vicinity. This difficulty can arise for several reasons. In some, rare instances, navigation application 116 may be inaccurate. More commonly, though, conventional navigation techniques sometimes fail to translate to the physical world or are not precise enough, such that results can be confusing or uncertain to distinguish the target location. Such can be a potential problem particularly for high-density urban areas as well as certain low density rural areas in which buildings or other likely target locations may be occluded or otherwise difficult to find.

In order to mitigate these or other shortcomings associated with navigation application 114 or other existing mapping or navigation approaches, or to otherwise improve guidance to a target location certain disclosed techniques can now be described in connection with FIG. 2.

Figure 2:
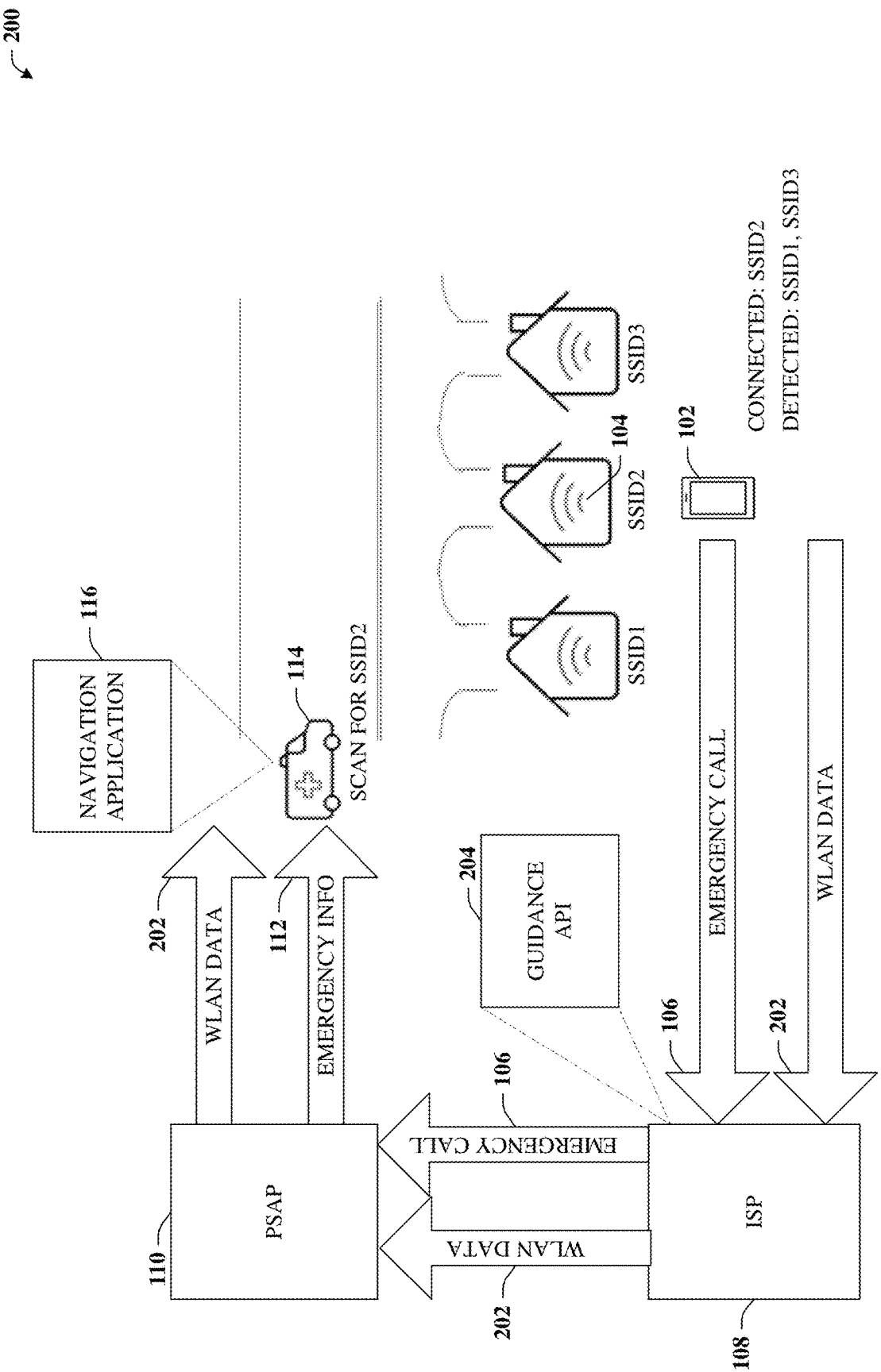
FIG. 2 shows a schematic block diagram illustrating one example of leveraging network device to facilitate improved guidance in accordance with certain embodiments of this disclosure.

Turning now to FIG. 2, a schematic block diagram 200 is presented. Diagram 200 illustrates one example of improved guidance in accordance with certain embodiments of this disclosure. Initially, it is observed that ISP 108 not only has the capability to interface to PSAP 110, but also typically maintains a presence at or near the target location by virtue of residential gateway (RG) 104.

RG 104 can be substantially any device that bridges network access between two networks. Typically, this bridge is between a local area network (LAN) such as a home network or wireless LAN (WLAN) and a wide area network (WAN) such as the Internet. RG 104 can thus provide internet connectivity via the associated WLAN to any device within its coverage area, such as mobile device 102. A non-limiting group of example RG 104 devices can include, e.g., a cable modem, a digital subscriber line (DSL) modem, a fiber optics modem, an internet protocol (IP) digital enhanced cordless telecommunications (DECT) phone or other device, a network switch device, a smart home hub device, a television or video on demand set top box or other device, a voice over IP (VoIP) device, a wired or wireless router device, or a wireless access point device.

Because ISP 108 has a presence in the target location from whence emergency call 106 originated, this presence can be leveraged in an advantageous way in a manner that PSAP 110 otherwise has no ability to do. For example, ISP 108 can receive WLAN data 202. WLAN data 202 can potentially be received from RG 104, mobile device 102, or potentially any device connected to RG 104 such as WLAN enabled smoke detectors, window or door security devices, and so forth. WLAN data 202 can include, for instance, a service set identifier (SSID) of RG 104 to which mobile device 102 is connected, in this example, SSID2. Additionally or alternatively, WLAN data 202 can include SSID values of other nearby access point (AP) devices that are in range and can be detected by mobile device 102, such as SSID1 and/or SSID3. In some embodiments, WLAN data 202 can also include signal strength metrics recorded by mobile device 102. Such information can be used to gain further insight into the actual location of mobile device 102 or for other beneficial purposes.

WLAN data 202 can be provided to PSAP 110, which can be forwarded to emergency services entity 114, either separately or as part of emergency information 112. In some embodiments, emergency services entity 114 can receive WLAN data 202 directly from ISP 108. In either case, a device of emergency services entity 114 can activate a scan for the particular SSID (e.g., SSID2) to which mobile device 102 is attached, namely the SSID associated with RG 104. Once in range of SSID2 (e.g., typically about 50 feet or so with widespread conventional technology), emergency services entity 114 can triangulate or track that signal to more efficiently find the target location.

In other words, RG 104 can operate in a manner similar to a transponder beacon like those used to locate downed aircraft. Essentially, emergency services entity 114 can zero in on the target location by scanning for or otherwise monitoring the correct SSID. In some embodiments, emergency services entity 114 might also scan for SSID1 and/or SSID3. Although these SSIDs do not originate from RG 104, but rather from neighboring devices, it is known that those SSIDs were detected by mobile device 102 (e.g., the source of emergency call 106), and therefore close to the site of the emergency situation. Such can effectively expand the detection radius to some degree, and might also be used as potential points of reference (e.g., it is known RG 104 is due east of SSID1, or similar) or for other beneficial uses.

As part of one example implementation, ISP 108 can expose one or more guidance application programming interfaces (APIs) 204 to various entities, such as to PSAP 110, emergency services entity 114, mobile device 102, RG 104, or another authorized or suitable entity. For example, guidance API 204 can be configured to respond to requests from PSAP 110 such as a request to query the device that made the 911 call or text (e.g., mobile device 102), query RG 104, or query the ISP for information relating to the street address of RG 104 (e.g., in cases where such was not already acquired by PSAP 110). Responses to these and other queries can be included in WLAN data 202.

As another example, guidance API 204 can receive information from PSAP 110 or other suitable entities. These and other elements are further described in connection with subsequent drawings. For the sake of brevity, it is understood that guidance API 204 can potentially be used as an interface to communicate information to or from PSAP 110 and/or emergency services entity 114, to communicate information to or from RG 104 or any device attached to RG 104, including mobile device 102, or to communicate information to or from any other suitable device.

It is noted that the disclosed subject matter is generally described herein in the context of improved guidance of emergency services to a target location. However, it is understood that techniques detailed herein are not limited only to emergency services and can be applicable to any suitable domain. For example, techniques identified herein can also be used advantageously to aid in guiding service technicians to a particular location, guiding delivery entities, or any other suitable application.

Example Passive Technique Systems

Figure 3:
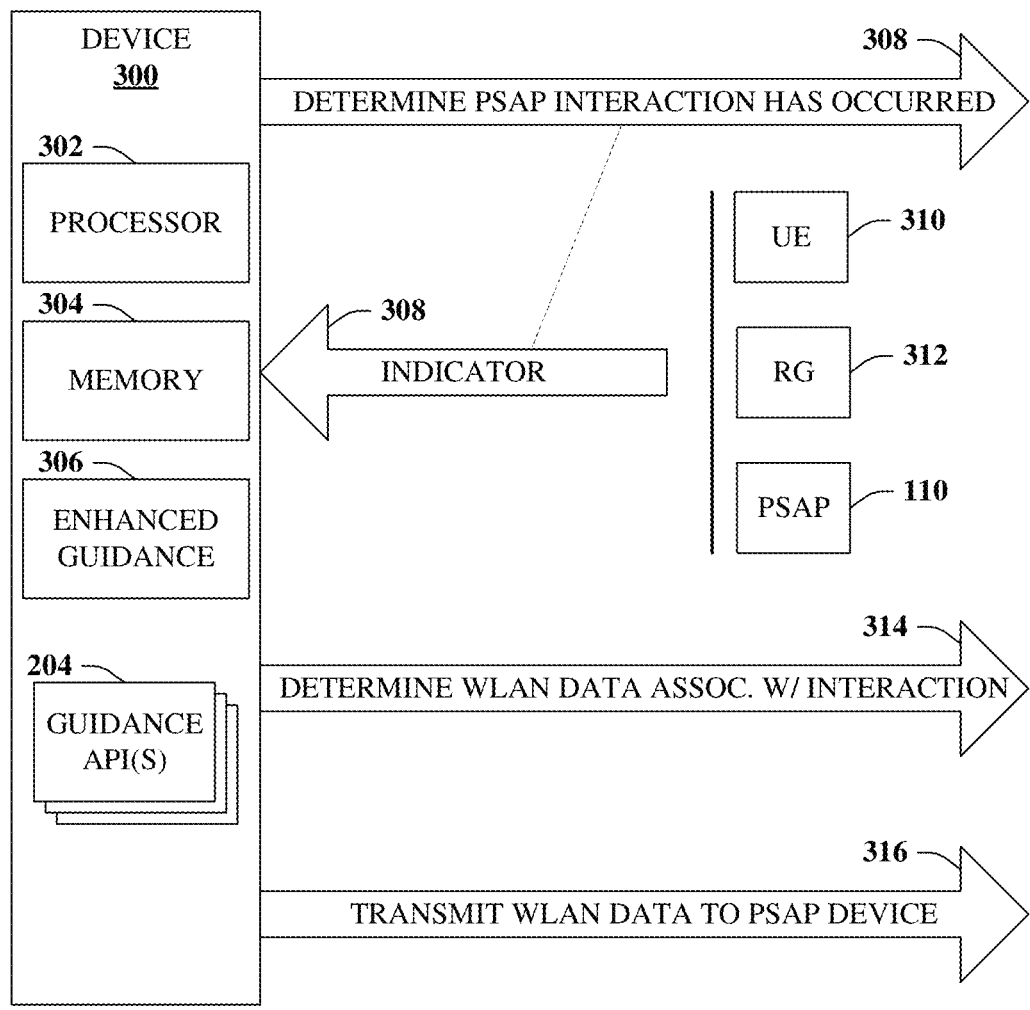
FIG. 3 depicts a schematic block diagram illustrating an example device that can utilize passive techniques to facilitate improved guidance to a target location in accordance with certain embodiments of this disclosure.

Referring now to FIG. 3, an example schematic block diagram is depicted illustrating an example device 300 that can utilize passive techniques to facilitate improved guidance to a target location in accordance with certain embodiments of this disclosure. For example, device 300 can be a network device of a network provider that provides network services to customers such as phone services, broadband services, as well as an enhanced guidance 306 service. Device 300 can comprise a processor 302 that can be specifically configured to provide enhanced guidance 306. Device 300 can also comprise memory 304 that stores executable instructions that, when executed by processor 302, can facilitate performance of operations. Processor 302 can be a hardware processor having structural elements known to exist in connection with processing units or circuits, with various operations of processor 302 being represented by functional elements shown in the drawings herein that can require special-purpose instructions, for example, stored in memory 304 and/or an enhanced guidance 306 component or circuit. Along with these special-purpose instructions, processor 302 and/or device 300 can be a special-purpose device. Further examples of the memory 304 and processor 302 can be found with reference to FIG. 10. It is to be appreciated that device 300 or computer 1002 can represent a server device of a communications network or a user equipment device and can be used in connection with implementing one or more of the systems, devices, or components shown and described in connection with FIG. 3 and other figures disclosed herein.

Hence, one likely embodiments is that device 300 represents a device of an ISP, such as ISP 108. Device 300 can expose guidance APIs 204 to facilitate some or all of the interactions detailed herein. For example, device 300 can perform determination 308 in which device 300 can determine that an interaction with PSAP 110 has occurred.

In some embodiments, determination 308 can occur in response to indicator 309 that is received by device 300 and that indicates the interaction with PSAP 110 has occurred. Indicator 309 can be received from user equipment (UE) 310, wherein UE 310 can be substantially any device attached to, or capable of attaching to, a WLAN. Hence, UE 310 can be a mobile phone that makes a 911 call or text, and in response sends indicator 309 to device 300. As another example, UE 310 can be a smoke detector device that is triggered and in response sends indicator 309 to device 300.

In some embodiments, indicator 309 can be provided to device 300 by RG 312 or another suitable AP device. Since RG 312 represents the gateway to all attached devices (e.g., all devices attached to the WLAN provided by RG 312), RG 312 is specially situated to identify when PSAP 110 has been contacted.

In some embodiments, indicator 309 can be provided by PSAP 110. For example, PSAP 110 can indicate it was contacted by a particular device (e.g., a particular mobile phone, a particular smoke detector, a home security entity that manages in-home devices such as the smoke detector, and so forth) at a particular street address. ISP 108 and/or device 300 can lookup relevant information from its own database(s) to identify the associated device and/or an associated RG 312 to which that device is attached. If for any reason PSAP 110 does not have the street address, but rather, only an identifier associated with the contacting device, such can be ascertained from the database lookup and provided to PSAP 110.

At this point, PSAP 110 knows an emergency situation exists at a specified location and/or street address and can dispatch first responders such as emergency services entity 114. Due at least in part to indicator 309, ISP 108 and/or device 300 has knowledge of the emergency situation as well. However, unlike PSAP 110, device 300 can leverage the presence of RG 312 at the location of the emergency situation.

For example, device 300 can perform determination 314 that can determine WLAN data 202 associated with the interaction with PSAP 110. As noted previously, WLAN data 202 can comprise an SSID that is currently being broadcast by RG 312. In some embodiments, determination 314 can be a result of a request or query (e.g., via guidance API 204) initiated by PSAP 110.

At reference numeral 316, device 300 can transmit WLAN data 202, comprising the SSID utilized by RG 312 to PSAP 110. Appreciably, PSAP 110 can forward WLAN data 202 to emergency services entity 114. In some embodiments, device 300 can forward WLAN data 202 directly to emergency services entity 114. Regardless, emergency services entity 114 can actively scan for any SSID that is provided in WLAN data 202 in order to, for instance, more quickly or efficiently locate the site of the emergency situation. Recall WLAN data 202 can include the SSID to which the contacting device (e.g., UE 310) is attached, as well as any SSID that is detected by the contacting device. Furthermore, WLAN data 202 can include signal strength metrics and/or determinations about distances away from a host device associated with a particular SSID, whether connected or merely detected.

It is appreciated that it is not strictly necessary for the mobile device 102 to be connected to a particular RG 104. For example, consider the scenario in which Alice is jogging on the beach. Alice has a wireless-enabled wearable device that monitors biometrics and is attached to her mobile phone 102. Suppose the wearable device records readings that indicate a potential cardiac arrest.

As a result, the wearable device activates an emergency signal, causing mobile phone 102 to make an E911 text. Such can be similar to emergency call 106. However, in this case, because device 102 is not connected to the home network, the call/text does not go to ISP 108. Rather, the call/text goes to the associated cellular provider. Cellular providers also conform to E911 standards, but the location that is provided automatically is not typically the location of mobile device 102, but rather the location of the cellular AP (e.g., eNodeB, gNodeBm, base station, or the like) that is providing service to mobile device 102.

Thus, in addition to ISP 108, guidance API 204 (and/or device 300) can also be included in a device of a cellular or other network such as a mobile service provider (MSP), an operations support system (OSS), or another suitable device or collection of devices. Note in this case WLAN data 202 does not include any attached networks (e.g., SSID2), but may include detected networks (e.g., SSID1 and SSID3). For example, suppose that not far from where Alice collapsed on the beach is a restaurant with a WLAN that is detected by Alice's mobile phone 102. If multiple SSIDs are detected, then selection can be based on signal strength or based on a determined distance away, or similar. Thus, all, or perhaps the nearest detected SSID or other information can be included in WLAN data 202 as detailed previously. Thus, emergency services entity 114 can scan for the particular SSID associated with the restaurant, which may be broadcasting as "Thomas' Crab Shack" or similar.

Furthermore, it is noted that guidance API 204 can be configured to be hosted by any and all ISP 108 (or cellular) providers or otherwise work in connection with any ISP 108 (or cellular) provider. Therefore, regardless of the particular provider of a given network device, techniques can be utilized in a seamless manner.

Example Active Technique Systems

Figure 4:
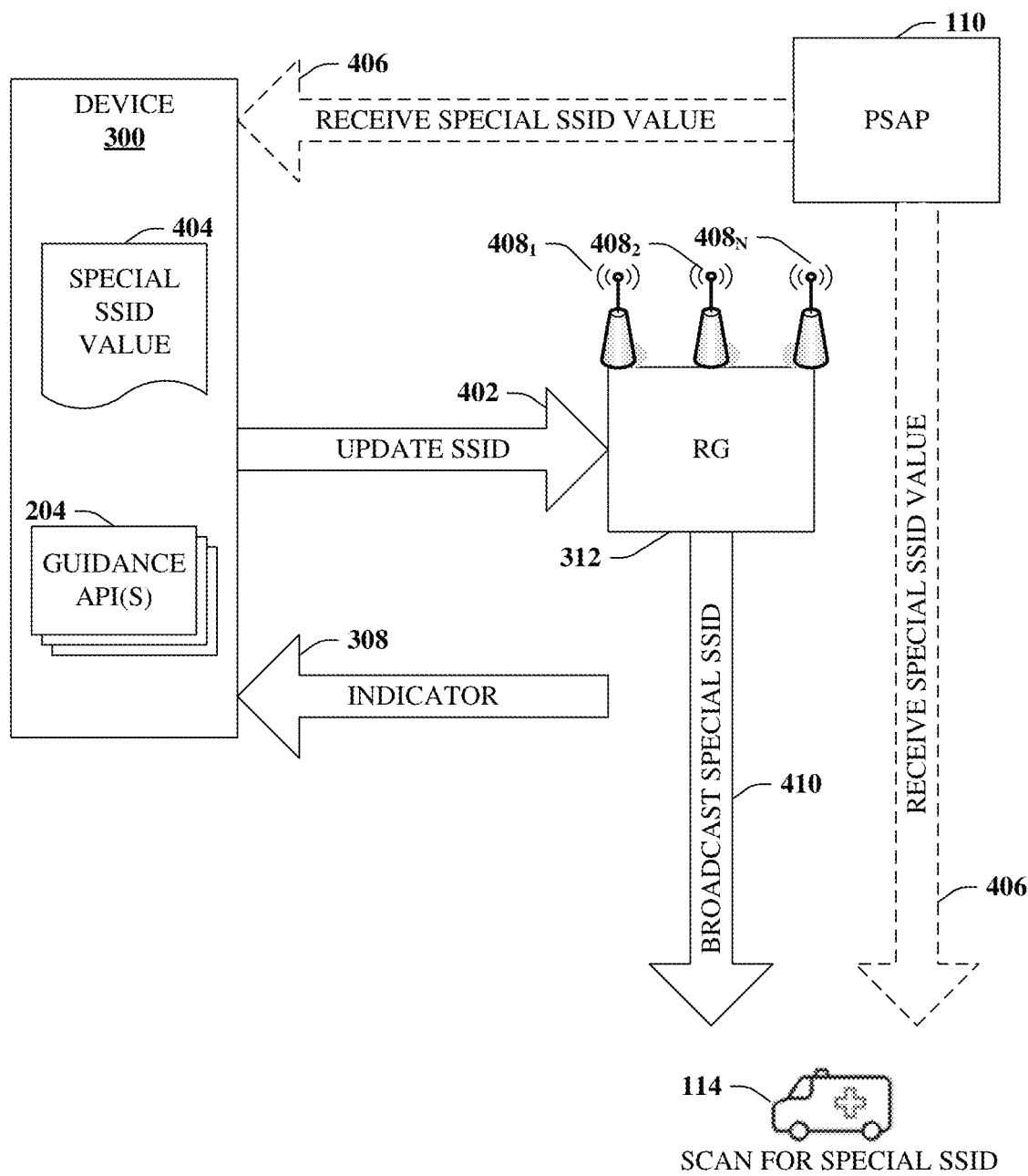
FIG. 4 depicts a schematic block diagram illustrating an example device that can utilize first active techniques to facilitate improved guidance to a target location in accordance with certain embodiments of this disclosure.

Turning now to FIG. 4, an example schematic block diagram is depicted illustrating an example device 300 that can utilize first active techniques to facilitate improved guidance to a target location in accordance with certain embodiments of this disclosure. It is appreciated that techniques described above are generally considered to be passive in nature. Namely, information that can be useful to guide emergency service entity 114 (or another suitable entity) to a target location can be queried or otherwise provided to entities that otherwise may have no access to such useful information. Additionally or alternatively, various active techniques can be promoted to further improve certain guidance techniques.

It is observed that many residential gateway devices, such as RG 312, residing at subscriber locations can have multiple antenna, illustrated here as antenna $408_1$-$408_N$, where N can be any suitable natural number. Hence, it is possible for any independent antenna to provide a distinct network. One common example is the case in which RG 312 provides a standard WLAN and separately provides a 5G WLAN. Depending on capabilities, any customer device can potentially connect to either one of these different WLANs, and each WLAN will have its own SSID that is continually broadcast to allow other devices to detect and identify. Thus, antenna 408$_1$ might broadcast a first SSID and serve the standard WLAN, antenna 408$_2$ might broadcast a second SSID and serve the 5G WLAN, while antenna 408$_N$ represents a spare antenna. Furthermore, a single antenna 408 can support multiple networks and/or multiple different SSIDs based on frequency band allocation. Thus, a single antenna 408 can function as described herein with respect to multiple antenna.

With the above in mind, now consider that device 300 has received indicator 309 from any suitable source as detailed previously, or has otherwise made determination 308 that PSAP 110 has been interacted with by a certain device that is attached to RG 312 (e.g., a device attached to RG 312 has dialed 911 or the like). Device 300 can further store a special SSID value 404. SSID value 404, as with typical SSIDs, can be a 128 bit string and can therefore encode a significant amount of potentially useful information. Typically, this string is used exclusive for naming conventions such as "My Home Network" or "My Home Network 5G".

However, special SSID value 404 can instead indicate "911 Emergency Here!" or conceivably encode some relevant information about the situation. As illustrated at reference numeral 402, device 300 can instruct RG 312 to update the SSID for at least one of the antenna 408 (or one particular portion of frequency spectrum) to special SSID value 404. In some embodiments, update 402 might only be performed if RG 312 has a spare antenna 408 or spare SSID capacity, or a spare SSID broadcast slot such as in the case where one antenna 408 supports multiple networks based on different frequency bands. As shown at reference numeral 410, that particular antenna 408 can now broadcast an SSID having the special SSID value 404, and emergency services entity 114 can scan for special SSID value 404.

Thus, broadcast 410 can be utilized by emergency services entity 114 to more quickly locate the site of the emergency. Furthermore, it is appreciated that other potential advantages of broadcast 410 can be leveraged. For example, broadcast 410 is not human perceivable and therefore is not likely by itself to be discovered by actors representing a cause of the emergency situation, even while serving to guide emergency services entity 114. Hence, broadcast 410 can in some sense operate similar to a silent alarm in situations in which such can be useful to PSAP 110 and/or emergency services entity 114.

It is appreciated that special SSID value 404 can be received from PSAP 110 as illustrated by reference numeral 406. Given that PSAP 110 will typically have much more information about the nature of the emergency, PSAP 110 can prudently determine what information should be encoded in special SSID value 404. In some embodiments, this special SSID value 404 can be a static value, such as "911 Emergency Here!" In that case, emergency services entity 114 can have dedicated resources that scan for the same special SSID value 404 and do not frequently need to update that value.

In some embodiments, special SSID value 404 can be dynamically determined. For example, emergency services entity 114 or PSAP 110 may determine that certain scenario-specific information can be useful to encode in special SSID value 404. For example, "911M725", where, for example, the "911" portion indicates the emergency situation and the "M725" portion indicates some specific character of this particular emergency situation. Since PSAP 110 is generally privy to much more information about the emergency than any other source, and as other mechanisms to convey such information to emergency services entity 114, information encoded in special SSID value 404 will typically relate to information that PSAP 110 is not ordinarily privy to, which is further detailed in connection with FIG. 5. However, if it is determined to be useful, information encoded in special SSID value 404 can include information for which PSAP 110 already has other mechanism to provide to emergency services entity 114 or for which emergency services entity 114 has other means of determining. For example, "M725" may indicate the type of equipment or treatment that is recommended to deploy once on-site, or some other information.

In some embodiments, update 402 can include power level adjustments to antenna 408. For example, the particular antenna 408 that is assigned special SSID value 404 can be adjusted to a maximum power level setting, thereby increasing the potential range of detection for emergency services entity 114. In some embodiments, update 402 can represent an instruction to revert antenna 408 back to a previous state or setting, which can be utilized, for instance, after emergency services entity 114 has arrived on-site or there is otherwise no longer a need to continue broadcasting special SSID value 404.

In some embodiments, update 402 can be triggered in response to a specific request from PSAP 110 or emergency services entity 114. For example, activating antenna 408 to broadcast special SSID value 404 can be in response to an indication that emergency services entity 114 is in the general vicinity (e.g., approaching a likely range of detection). Similarly, such might also apply to updates 402 that affect the power levels of antenna 408 or reverting back to a previous state.

In some embodiments, update 402 is not necessarily limited only to affecting RG 312. In some cases, update 402, as detailed herein in connection with RG 312, may be applicable to a different RG or access point (AP) device, such as any AP that is detected by the UE 310. For instance, consider again the scenario in which Alice is jogging on the beach. That example was provided in the context of passive techniques of FIG. 2. However, in some cases, it is conceivable that some active techniques such as update 402 (or activation 504 discussed infra in connection with FIG. 5) may be applied to the AP device of Thomas' Crab Shack in a manner similar to that described in connection with RG 312.

Figure 5:
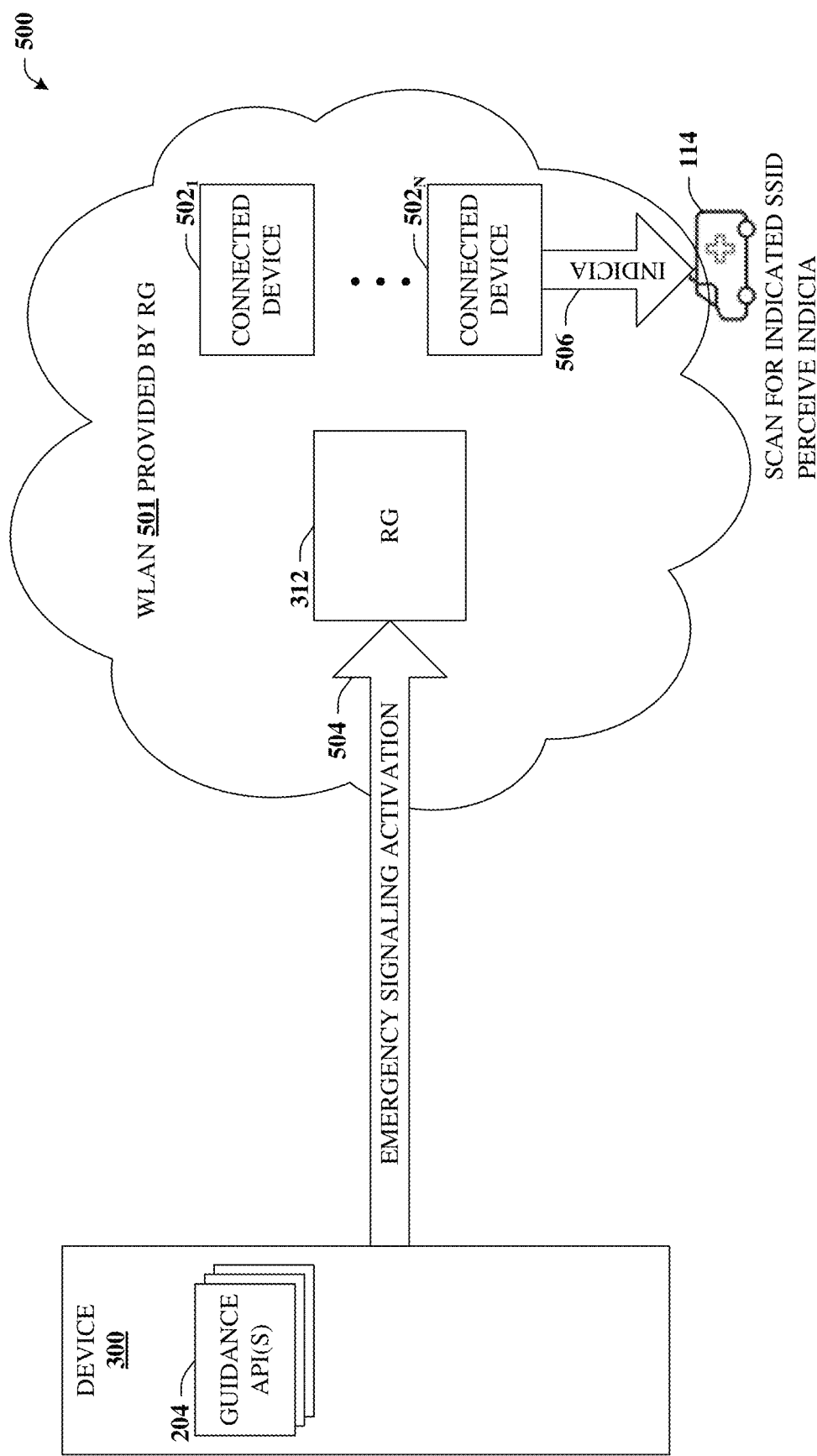
FIG. 5 shows a schematic block diagram illustrating an example device that can utilize second active techniques to facilitate improved guidance to a target location in accordance with certain embodiments of this disclosure.

Referring now to FIG. 5, a schematic block diagram 500 is depicted illustrating example device 300 that can utilize second active techniques to facilitate improved guidance to a target location in accordance with certain embodiments of this disclosure. As indicated previously, RG 312 can provide one or more WLANs, indicated here as WLAN 501. Any natural number, N, connected devices 502$_1$-502$_N$, can be served by RG 312. These connected devices 502 can include home security devices, Internet-of-Things (IoT) devices, UE devices 310, or any other suitable devices.

In this example, suppose connected device 502$_N$ represents a device of a door security system. Connected device 502$_N$ has the capability to generate indicia 506 such as visual indicia or audible indicia. Thus, representative examples of connected device 502$_N$ can be, e.g., a connected porch light or a connected siren. Potentially in response to determining that suitable devices 502 exist, device 300 can issue emergency signaling activation 504. Emergency signaling activation 504 can be issued to RG 312, which can forward the appropriate instruction. Emergency signaling activation 504 can instruct one or more of connected devices 502 to activate an emergency signaling state that signals the presence of an emergency. For example, a porch light can be activated, can be programmed to flash or blink at a defined frequency or with a defined color. Likewise, a siren device can be activated or programmed to emit sound at a particular frequency or according to a particular template or format, which can include speech, music, or other sounds. In other words, emergency signaling activation 504 can cause connected device $502_N$ to generate certain indicia 506. Typically, said indicia 506 can be perceivable from the street or other likely point of approach by emergency services entity 114.

Moreover, once it is determined that suitable connected device $502_N$ exists and can be utilized to aid in guidance such information can be provided to PSAP 110 and/or emergency services entity 114. Thus, these entities can decide or provide input as to how best to make use of those devices, such as when to initiate or deactivate emergency signaling activation 504 or a specified type or character of indicia 506.

In some embodiments, a description of indicia 506 can be encoded in special SSID value 404 to aid emergency services entity 114 in discovering the target location. For example, special SSID value 404 can be encoded as follows: "911M725—Look for blue flashing porch light". As noted, special SSID value 404 can be broadcast by at least one antenna 408 of RG 312 at maximum power level. As soon as emergency services entity 114 is in range of that broadcast, or even before being in range, it is possible that indicia 506 (e.g., a flashing blue porch light) can be perceived by emergency services entity 114, potentially simplifying the task of finding the target location.

Once emergency services entity 114 is on-site or based on some other criteria (e.g., expiration of a defined time period), RG 312 can revert back to a previous or different state (e.g., no longer broadcasting special SSID value 404) and connected device $502_N$ can also revert back to a previous or different state.

Example Methods

Figure 6:
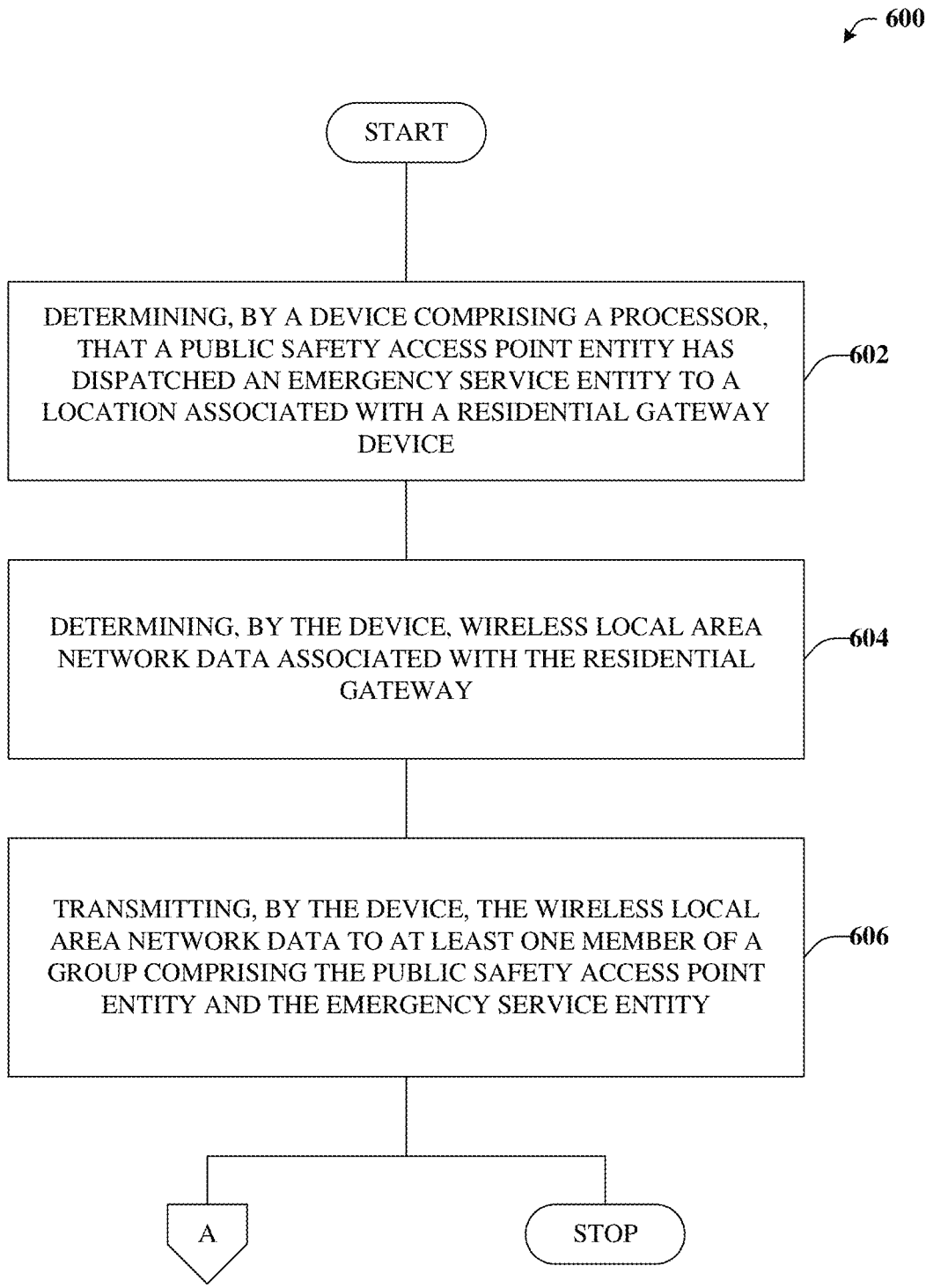
FIG. 6 illustrates an example method that can leverage the existence of networked devices to provide improved guidance in accordance with certain embodiments of this disclosure.
Figure 7:
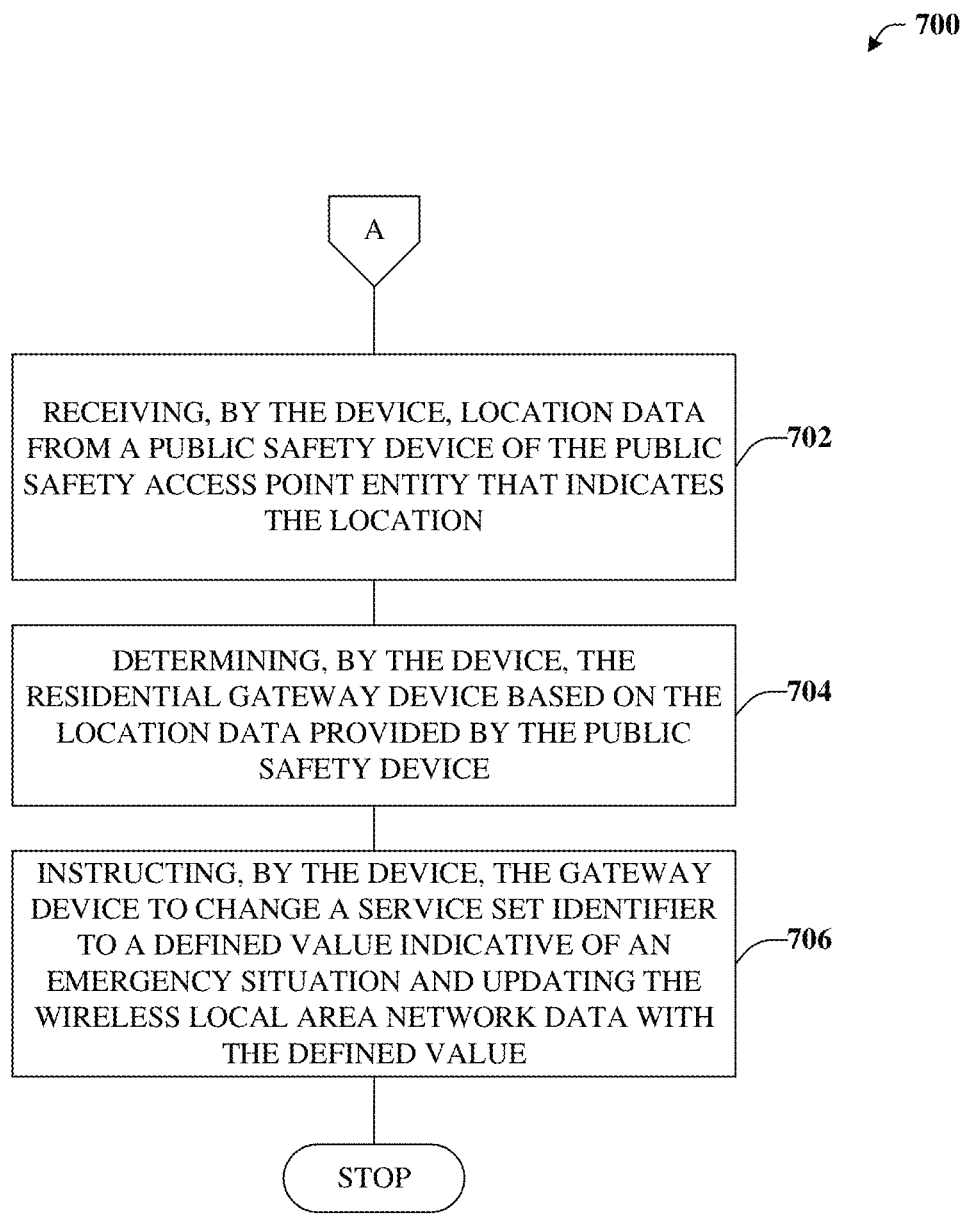
FIG. 7 illustrates an example method that can provide for additional elements or aspects in connection with leveraging network equipment to provide improved guidance in accordance with certain embodiments of this disclosure.

FIGS. 6 and 7 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 6, exemplary method 600 is depicted. Method 600 can leverage the existence of networked devices to provide improved guidance in accordance with certain embodiments of this disclosure. For example, at reference numeral 602, a device comprising a processor can determine that a public safety access point (PSAP) entity has dispatched an emergency service (ES) entity to a location associated with a residential gateway (RG) device. As an example, a UE device such as a mobile phone may make a call or send a text to 911, which can be received by the PSAP entity that can immediately dispatch the ES entity to the location of the emergency. Provided the mobile phone is attached to the residential gateway, it can be presumed that the mobile device is at the location of the RG, which could be the subscribers residence, workplace, or the like.

Alternatively, even if the mobile phone is not attached to the RG and the 911 call or text is propagated by cellular network devices, PSAP entity may have determined the location in another way and that location can be provided to the device to ascertain an appropriate RG or other suitable device. In another embodiment, the location and/or appropriate RG can be determined by identification of an RG or other appropriate AP that is detected by the mobile device.

At reference numeral 604, the device can determine wireless local area network (WLAN) data associated with the residential gateway. For instance, the RG can be one to which the mobile device is attached at the time of the 911 text or call or could be identified in another way such as the nearest RG to the mobile device, the RG that is associated with a location provided by the PSAP entity, or determined in another way.

At reference numeral 606, the device can transmit the wireless local area network data to at least one member of a group comprising the public safety access point entity and the emergency service entity. Since this WLAN data can comprise an SSID associated with the RG, the ES entity can scan for the provided SSID in order to triangulate the signal once in range of the RG broadcast. Method 600 can stop or proceed to insert A, which is further detailed in connection with FIG. 7.

With reference now to FIG. 7, exemplary method 700 is illustrated. Method 700 can provide for additional elements or aspects in connection with leveraging network equipment to provide improved guidance in accordance with certain embodiments of this disclosure. For example, at reference numeral 702, the device can receive location data from a public safety device of the public safety access point entity that indicates the location.

At reference numeral 704, the device can determine the residential gateway device based on the location data provided by the public safety device. For example, an address lookup can be performed on a subscriber database or data store. In other embodiments, the residential gateway can be determined in other ways, for instance, based on WLAN data (e.g., SSIDs of attached or nearby devices) associated with the mobile device that made the 911 text or call.

However, regardless of how the residential gateway is identified, at reference numeral 706, the device can instruct the residential gateway device to change a service set identifier to a defined value indicative of an emergency situation and updating the wireless local area network data with the defined value. For example, the SSID can be changed to "911 Emergency" or similar. As stated previously, the ES entity can scan for this particular SSID when seeking to reach the site of the emergency.

Example Operating Environments

Figure 8:
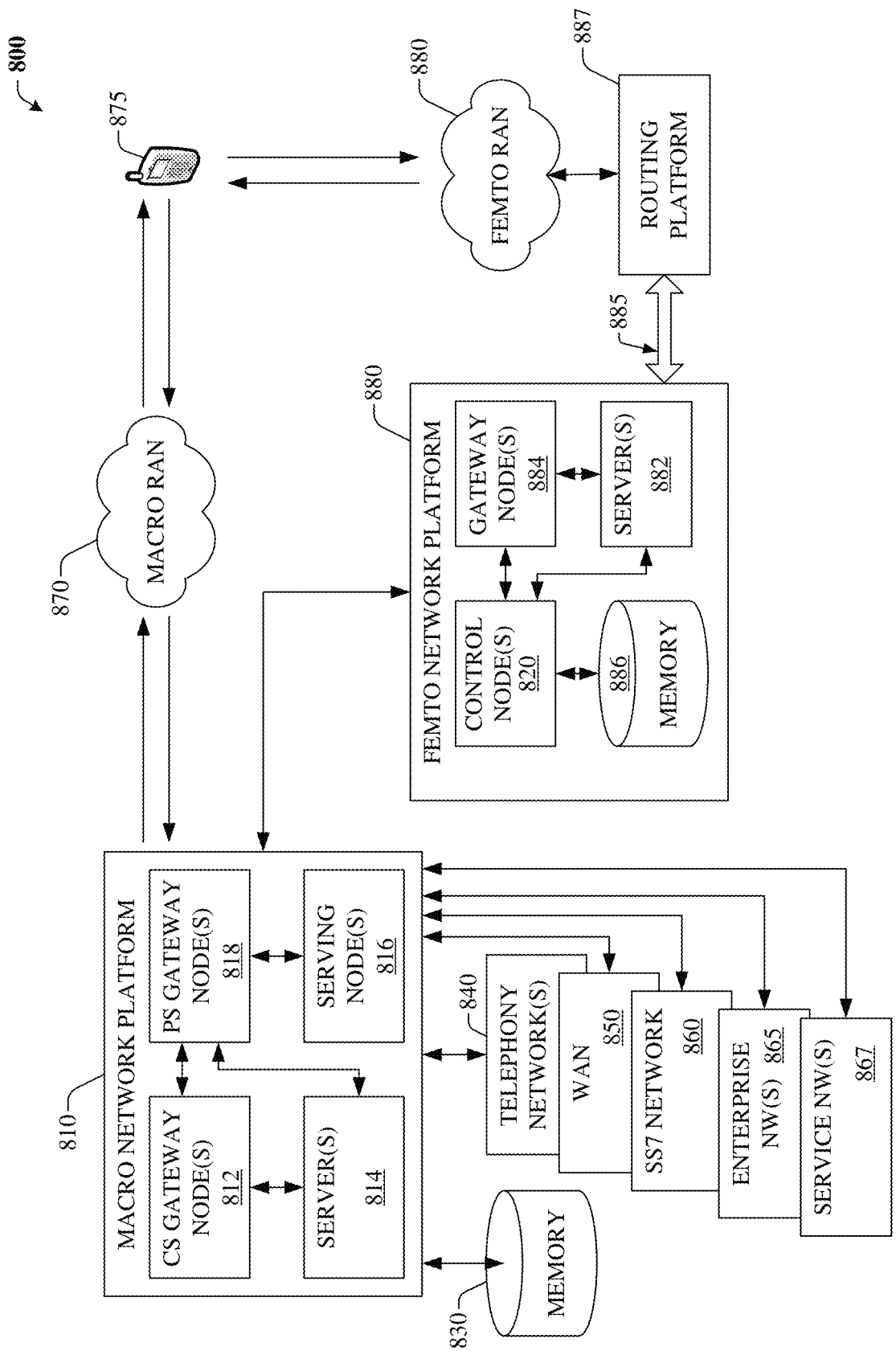
FIG. 8 illustrates a first example of a wireless communications environment with associated components that can be operable to execute certain embodiments of this disclosure.

To provide further context for various aspects of the subject specification, FIG. 8 illustrates an example wireless communication environment 800, with associated components that can enable operation of a femtocell enterprise network in accordance with aspects described herein. Wireless communication environment 800 comprises two wireless network platforms: (i) A macro network platform 810 that serves, or facilitates communication with, user equipment 875 via a macro radio access network (RAN) 870. It should be appreciated that in cellular wireless technologies (e.g., 4G, 3GPP UMTS, HSPA, 3GPP LTE, 3GPP UMB, 5G), macro network platform 810 is embodied in a Core Network. (ii) A femto network platform 880, which can provide communication with UE 875 through a femto RAN 890, linked to the femto network platform 880 through a routing platform 887 via backhaul pipe(s) 885. It should be appreciated that femto network platform 880 typically off-loads UE 875 from macro network, once UE 875 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN1370 can comprise various coverage cells, while femto RAN 890 can comprise multiple femto access points or multiple metro cell access points. As mentioned above, it is to be appreciated that deployment density in femto RAN 890 can be substantially higher than in macro RAN 870.

Generally, both macro and femto network platforms 810 and 880 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 810 comprises CS gateway node(s) 812 which can interface CS traffic received from legacy networks like telephony network(s) 840 (e.g., public switched telephone network (PSTN), or public land mobile network (PLMN)) or a SS7 network 860. Circuit switched gateway 812 can authorize and authenticate traffic (e.g., voice) arising from such networks. Additionally, CS gateway 812 can access mobility, or roaming, data generated through SS7 network 860; for instance, mobility data stored in a VLR, which can reside in memory 830. Moreover, CS gateway node(s) 812 interfaces CS-based traffic and signaling and gateway node(s) 818. As an example, in a 3GPP UMTS network, gateway node(s) 818 can be embodied in gateway GPRS support node(s) (GGSN).

In addition to receiving and processing CS-switched traffic and signaling, gateway node(s) 818 can authorize and authenticate PS-based data sessions with served (e.g., through macro RAN) wireless devices. Data sessions can comprise traffic exchange with networks external to the macro network platform 810, like wide area network(s) (WANs) 850; it should be appreciated that local area network(s) (LANs) can also be interfaced with macro network platform 810 through gateway node(s) 818. Gateway node(s) 818 generates packet data contexts when a data session is established. To that end, in an aspect, gateway node(s) 818 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 814. It is to be noted that in 3GPP UMTS network(s), gateway node(s) 818 (e.g., GGSN) and tunnel interface (e.g., TTG) comprise a packet data gateway (PDG).

Macro network platform 810 also comprises serving node(s) 816 that convey the various packetized flows of information or data streams, received through gateway node(s) 818. As an example, in a 3GPP UMTS network, serving node(s) can be embodied in serving GPRS support node(s) (SGSN).

As indicated above, server(s) 814 in macro network platform 810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 810. Data streams can be conveyed to gateway node(s) 818 for authorization/authentication and initiation of a data session, and to serving node(s) 816 for communication thereafter. Server(s) 814 can also effect security (e.g., implement one or more firewalls) of macro network platform 810 to ensure network's operation and data integrity in addition to authorization and authentication procedures that CS gateway node(s) 812 and gateway node(s) 818 can enact. Moreover, server(s) 814 can provision services from external network(s), e.g., WAN 850, or Global Positioning System (GPS) network(s) (not shown). It is to be noted that server(s) 814 can comprise one or more processor configured to confer at least in part the functionality of macro network platform 810. To that end, the one or more processor can execute code instructions stored in memory 830, for example.

In example wireless environment 800, memory 830 stores information related to operation of macro network platform 810. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 830 can also store information from at least one of telephony network(s) 840, WAN(s) 850, or SS7 network 860, enterprise NW(s) 865, or service NW(s) 867.

Femto gateway node(s) 884 have substantially the same functionality as PS gateway node(s) 818. Additionally, femto gateway node(s) 884 can also comprise substantially all functionality of serving node(s) 816. In an aspect, femto gateway node(s) 884 facilitates handover resolution, e.g., assessment and execution. Further, control node(s) 820 can receive handover requests and relay them to a handover component (not shown) via gateway node(s) 884. According to an aspect, control node(s) 820 can support RNC capabilities.

Server(s) 882 have substantially the same functionality as described in connection with server(s) 814. In an aspect, server(s) 882 can execute multiple application(s) that provide service (e.g., voice and data) to wireless devices served through femto RAN 890. Server(s) 882 can also provide security features to femto network platform. In addition, server(s) 882 can manage (e.g., schedule, queue, format . . . ) substantially all packetized flows (e.g., IP-based) it generates in addition to data received from macro network platform 810. It is to be noted that server(s) 882 can comprise one or more processor configured to confer at least in part the functionality of macro network platform 810. To that end, the one or more processor can execute code instructions stored in memory 886, for example.

Memory 886 can comprise information relevant to operation of the various components of femto network platform 880. For example, operational information that can be stored in memory 886 can comprise, but is not limited to, subscriber information; contracted services; maintenance and service records; femto cell configuration (e.g., devices served through femto RAN 890; access control lists, or white lists); service policies and specifications; privacy policies; add-on features; and so forth.

It is noted that femto network platform 880 and macro network platform 810 can be functionally connected through one or more reference link(s) or reference interface(s). In addition, femto network platform 880 can be functionally coupled directly (not illustrated) to one or more of external network(s) 840, 850, 860, 865 or 867. Reference link(s) or interface(s) can functionally link at least one of gateway node(s) 884 or server(s) 886 to the one or more external networks 840, 850, 860, 865 or 867.

Figure 9:
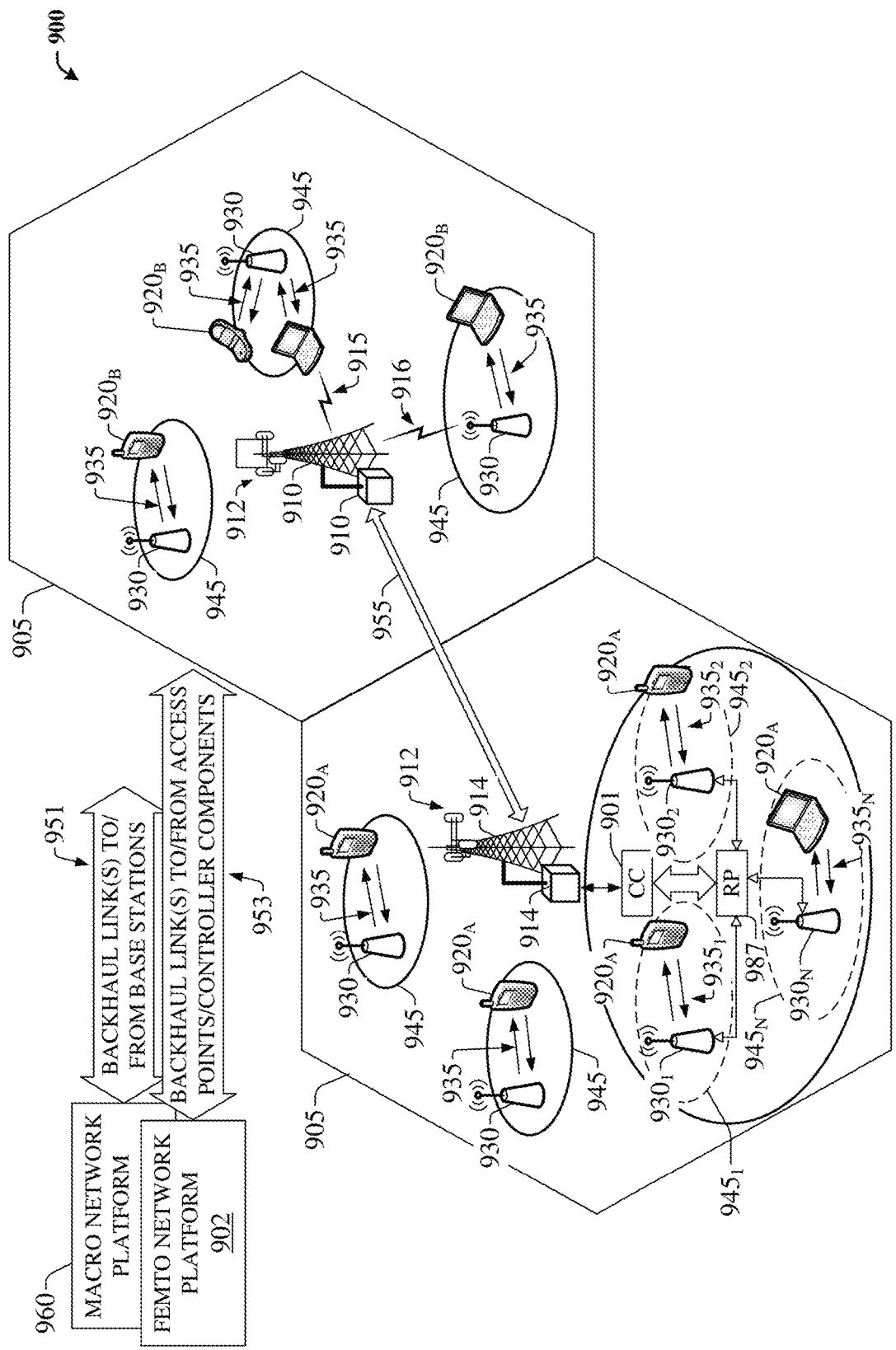
FIG. 9 illustrates a second example of a wireless communications environment with associated components that can be operable to execute certain embodiments of this disclosure.

FIG. 9 illustrates a wireless environment that comprises macro cells and femtocells for wireless coverage in accordance with aspects described herein. In wireless environment 905, two areas represent "macro" cell coverage; each macro cell is served by a base station 910. It can be appreciated that macro cell coverage area 905 and base station 910 can comprise functionality, as more fully described herein, for example, with regard to system 900. Macro coverage is generally intended to serve mobile wireless devices, like UE $920_A$, $920_B$, in outdoors locations. An over-the-air (OTA) wireless link 935 provides such coverage, the wireless link 935 comprises a downlink (DL) and an uplink (UL), and utilizes a predetermined band, licensed or unlicensed, of the radio frequency (RF) spectrum. As an example, UE $920_A$, $920_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 910 communicates via backhaul link(s) 951 with a macro network platform 960, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 960 controls a set of base stations 910 that serve either respective cells or a number of sectors within such cells. Base station 910 comprises radio equipment 914 for operation in one or more radio technologies, and a set of antennas 912 (e.g., smart antennas, microwave antennas, satellite dish(es) . . . ) that can serve one or more sectors within a macro cell 905. It is noted that a set of radio network control node(s), which can be a part of macro network platform 960; a set of base stations (e.g., Node B 910) that serve a set of macro cells 905; electronics, circuitry or components associated with the base stations in the set of base stations; a set of respective OTA wireless links (e.g., links 915 or 916) operated in accordance to a radio technology through the base stations; and backhaul link(s) 955 and 951 form a macro radio access network (RAN). Macro network platform 960 also communicates with other base stations (not shown) that serve other cells (not shown). Backhaul link(s) 951 or 953 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., LoS or non-LoS) backbone link. Backhaul pipe(s) 955 link disparate base stations 910. According to an aspect, backhaul link 953 can connect multiple femto access points 930 and/or controller components (CC) 901 to the femto network platform 902. In one example, multiple femto APs can be connected to a routing platform (RP) 987, which in turn can be connect to a controller component (CC) 901. Typically, the information from UEs $920_A$ can be routed by the RP 987, for example, internally, to another UE $920_A$ connected to a disparate femto AP connected to the RP 987, or, externally, to the femto network platform 902 via the CC 901, as discussed in detail supra.

In wireless environment 905, within one or more macro cell(s) 905, a set of femtocells 945 served by respective femto access points (APs) 930 can be deployed. It can be appreciated that, aspects of the subject innovation can be geared to femtocell deployments with substantive femto AP density, e.g., $9^4$-$10^7$ femto APs 930 per base station 910. According to an aspect, a set of femto access points $930_1$-$930_N$, with N a natural number, can be functionally connected to a routing platform 987, which can be functionally coupled to a controller component 901. The controller component 901 can be operationally linked to the femto network platform 902 by employing backhaul link(s) 953. Accordingly, UE $920_A$ connected to femto APs $930_1$-$930_N$ can communicate internally within the femto enterprise via the routing platform (RP) 987 and/or can also communicate with the femto network platform 902 via the RP 987, controller component 901 and the backhaul link(s) 953. It can be appreciated that although only one femto enterprise is depicted in FIG. 9, multiple femto enterprise networks can be deployed within a macro cell 905.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 9, in example embodiment 900, base station AP 910 can receive and transmit signal(s) (e.g., traffic and control signals) from and to wireless devices, access terminals, wireless ports and routers, etc., through a set of antennas $912_1$-$912_N$. It should be appreciated that while antennas $912_1$-$912_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 comprises a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/ signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Figure 10:
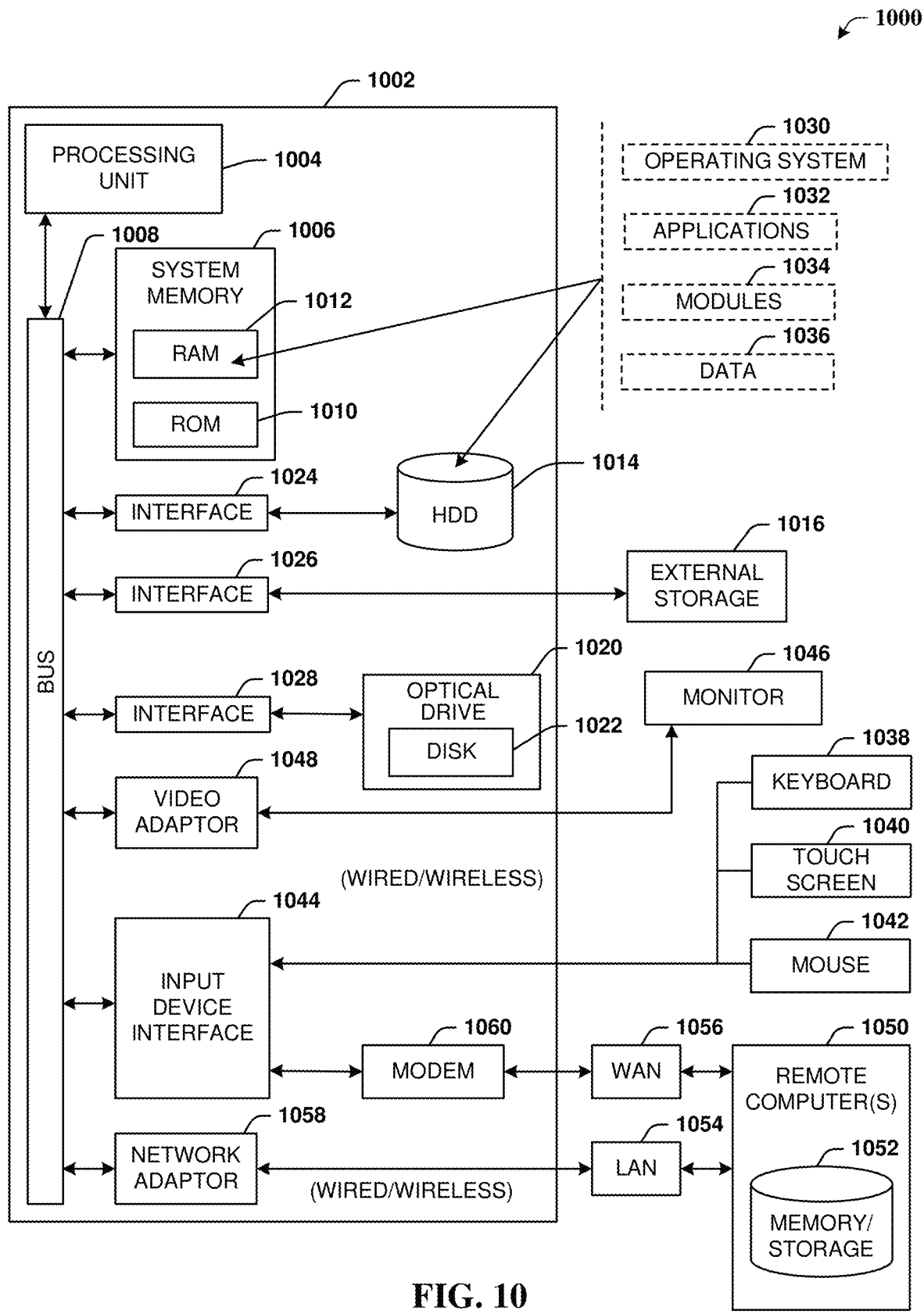
FIG. 10 illustrates an example block diagram of a computer operable to execute certain embodiments of this disclosure.

Referring now to FIG. 10, there is illustrated a block diagram of an exemplary computer system operable to execute the disclosed architecture. In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/ or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A device, comprising:
a processor; and
a memory that stores executable instructions that, when executed by the processor, facilitate performance of operations, the operations comprising:
determining that a user equipment associated with a residential gateway device has interacted with a public safety access point entity that is configured to dispatch an emergency service entity;
determining wireless local area network data, associated with usage of a wireless local area network by the user equipment, comprising a service set identifier of the residential gateway device to which the user equipment is attached; and
transmitting the wireless local area network data, comprising the service set identifier of the residential gateway device, to a public safety access point device associated with the public safety access point entity.

2. The device of claim 1, wherein the determining that the user equipment has interacted with the public safety access point entity comprises receiving an indicator from the user equipment.

3. The device of claim 1, wherein the determining that the user equipment has interacted with the public safety access point entity comprises receiving an indicator from the public safety access point device.

4. The device of claim 1, wherein the determining the wireless local area network data further comprises determining a detected service set identifier indicative of a neighboring residential gateway device that is detected by the user equipment.

5. The device of claim 4, wherein the wireless local area network data comprises the detected service set identifier indicative of the neighboring residential gateway device.

6. The device of claim 5, wherein the detected service set identifier indicative of the neighboring residential gateway device is determined to be a nearest residential gateway device to the user equipment that interacted with the public safety access point entity.

7. The device of claim 1, wherein the operations further comprise instructing the residential gateway device to update the service set identifier to a defined value indicative of an emergency situation.

8. The device of claim 7, wherein the operations further comprise receiving, from the public safety access point entity, the defined value.

9. The device of claim 1, wherein the operations further comprise determining a group of devices that are attached to the residential gateway device.

10. The device of claim 9, wherein the operations further comprise instructing at least one device of the group of devices to activate an emergency signaling state that signals a presence of an emergency.

11. The device of claim 10, wherein activation of the emergency signaling state is in response to a request from the emergency service entity.

12. The device of claim 10, wherein deactivation of the emergency signaling state is in response to at least one of: a request from the emergency service entity or an expiration of a defined period of time.

13. A non-transitory machine-readable medium, comprising executable instructions that, when executed by a processor, facilitate performance of operations, the operations comprising:

determining that a service provider entity has dispatched a service entity to a location associated with a residential gateway device;

determining wireless local area network data associated with usage of a wireless local area network, comprising a service set identifier of the residential gateway device; and transmitting the wireless local area network data to a member of a group comprising the service provider entity and the service entity.

14. The non-transitory machine-readable medium of claim 13, wherein the operations further comprise instructing the residential gateway device to update the service set identifier to a specified service set identifier comprising a defined value representative of a service to be received at the location.

15. The non-transitory machine-readable medium of claim 14, wherein the operations further comprise updating the wireless local area network data with the defined value.

16. The non-transitory machine-readable medium of claim 13, wherein the operations further comprise instructing at least one device of a group of devices attached to the residential gateway device to activate a signaling mode.

17. A method, comprising:

determining, by a device comprising a processor, that a public safety access point entity has dispatched an emergency service entity to a location associated with a residential gateway device;

determining, by the device, wireless local area network data associated with the residential gateway device; and transmitting, by the device, the wireless local area network data to at least one member of a group comprising the public safety access point entity and the emergency service entity.

18. The method of claim 17, further comprising receiving, by the device, location data from a public safety device of the public safety access point entity that indicates the location.

19. The method of claim 17, further comprising determining, by the device, the residential gateway device based on the location data provided by the public safety device.

20. The method of claim 17, further comprising instructing, by the device, the residential gateway device to change a service set identifier to a defined value indicative of an emergency situation and updating the wireless local area network data with the defined value.

\* \* \* \* \*